United States Patent
Chen

(10) Patent No.: US 7,043,856 B2
(45) Date of Patent: May 16, 2006

(54) SHOES WITH SIDE PANEL FOR CONNECTION OUTSOLE

(76) Inventor: Chuang-Chuan Chen, 11F-2, No. 43 Chai-I Street, Taichung City (TW)

( * ) Notice: Subject to any disclaimer, the term of this patent is extended or adjusted under 35 U.S.C. 154(b) by 31 days.

(21) Appl. No.: 10/936,192

(22) Filed: Sep. 7, 2004

(65) Prior Publication Data

US 2006/0048410 A1    Mar. 9, 2006

(51) Int. Cl.
*A43C 13/08* (2006.01)
(52) U.S. Cl. .............................................. 36/14; 36/12
(58) Field of Classification Search .................... 36/12, 36/14

See application file for complete search history.

(56) References Cited

U.S. PATENT DOCUMENTS

| 4,034,431 A | * | 7/1977 | Fukuoka ................. 12/142 MC |
| 4,150,455 A | * | 4/1979 | Fukuoka ................. 12/142 RS |
| 4,899,465 A | * | 2/1990 | Bleimhofer et al. ........... 36/14 |
| 6,763,609 B1 | * | 7/2004 | Su ................................. 36/12 |
| 6,789,334 B1 | * | 9/2004 | Wu ............................. 36/77 R |

* cited by examiner

Primary Examiner—Ted Kavanaugh

(57) ABSTRACT

A shoe includes a vamp with an insole and a side panel encloses a periphery of a lower portion of the vamp. The side panel includes a plurality of apertures and at least one gap is defined between the vamp and the side panel. Material such as rubber for an outsole encloses the side panel and is filled in the at least one gap and the apertures. The shoe needs no stitching and gluing.

4 Claims, 3 Drawing Sheets

SHOES WITH SIDE PANEL FOR CONNECTION OUTSOLE

FIELD OF THE INVENTION

The present invention relates to a shoe having a side panel and an outsole which is connected to the vamp and the side panel without gluing and stitching.

BACKGROUND OF THE INVENTION

A conventional shoe is composed of vamp and outsole which is generally connected to the vamp by stitching or gluing. Stitching requires a lot of sewing machines operated by skilled workers and is a time-consuming job. Because each shoe involves a lot of labor work and time so that the cost is high which is not accepted in the market gradually. Gluing requires high quality of glue and the gluing area has to be ground to have a rough surface so that the glue may function as desired. However, almost every kind of glue used in the industry includes toxic chemical ingredients which harm lungs of the workers. Besides, small particles of the vamp are generated during grinding the gluing areas of the vamps and the outsoles.

The present invention intends to provide a shoe that needs no stitching and gluing when connecting the outsole to the vamp.

SUMMARY OF THE INVENTION

The present invention relates to a shoe that comprises a vamp with an insole connected to an underside thereof and a side panel encloses a periphery of a lower portion of the vamp. The side panel includes a plurality of apertures defined therethrough and at least one gap is defined between the vamp and the side panel. An outsole encloses the side panel and the insole, material of the outsole filled in the at least one gap and the apertures.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 shows that a gap is defined between the side panel and the vamp;

DETAILED DESCRIPTION OF THE PREFERRED EMBODIMENT

Figure 1:
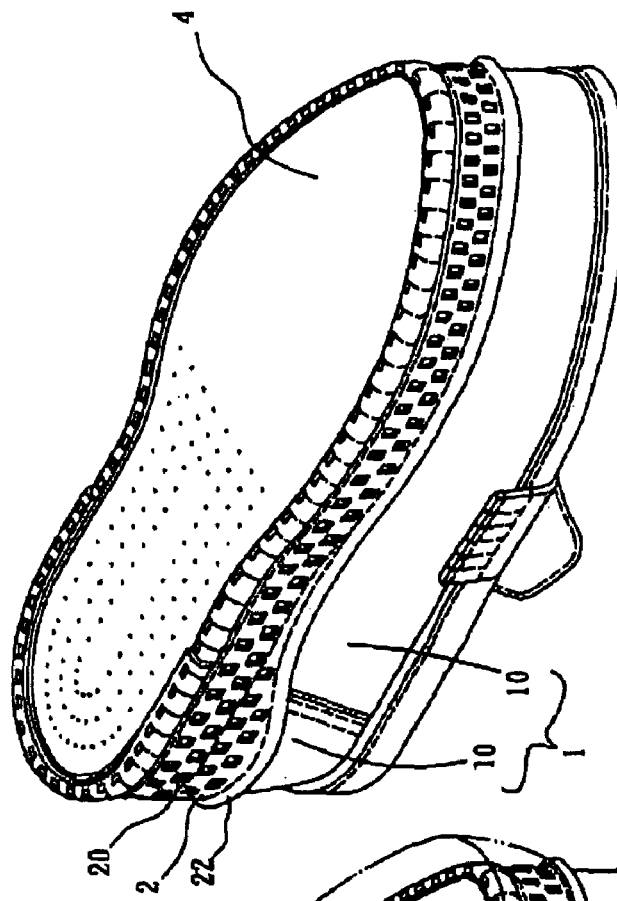
FIG. 1 shows a shoe with the side panel enclosing the vamp.
Figure 3:
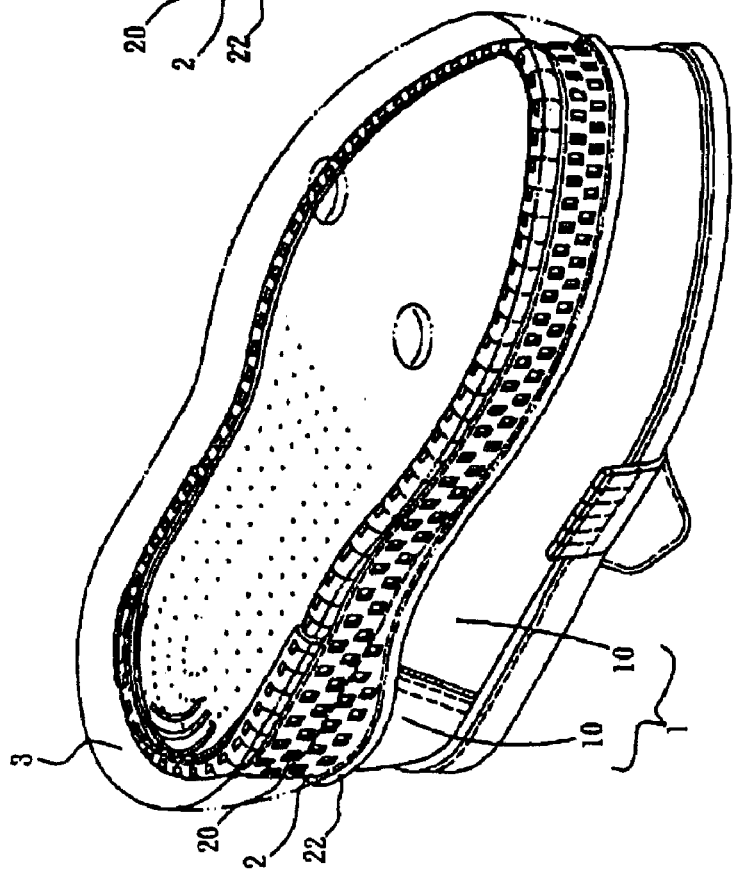
FIG. 3 shows an outsole enclosing the bottom of the vamp and the side panel.
Figure 4:
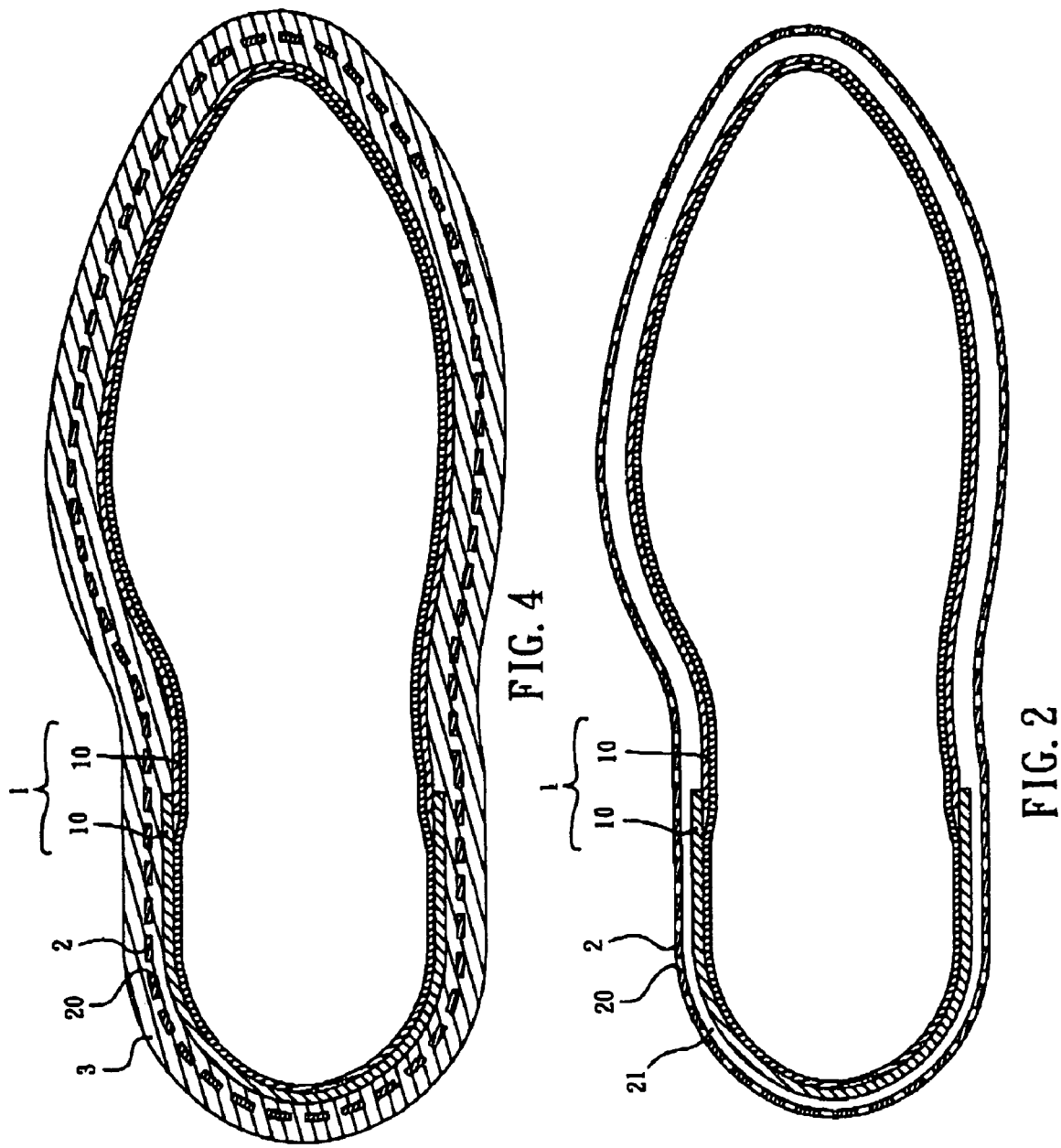
FIG. 4 is a bottom cross sectional view to show the material of the outsole filled in the gap between the side panel and the vamp.
Figure 5:
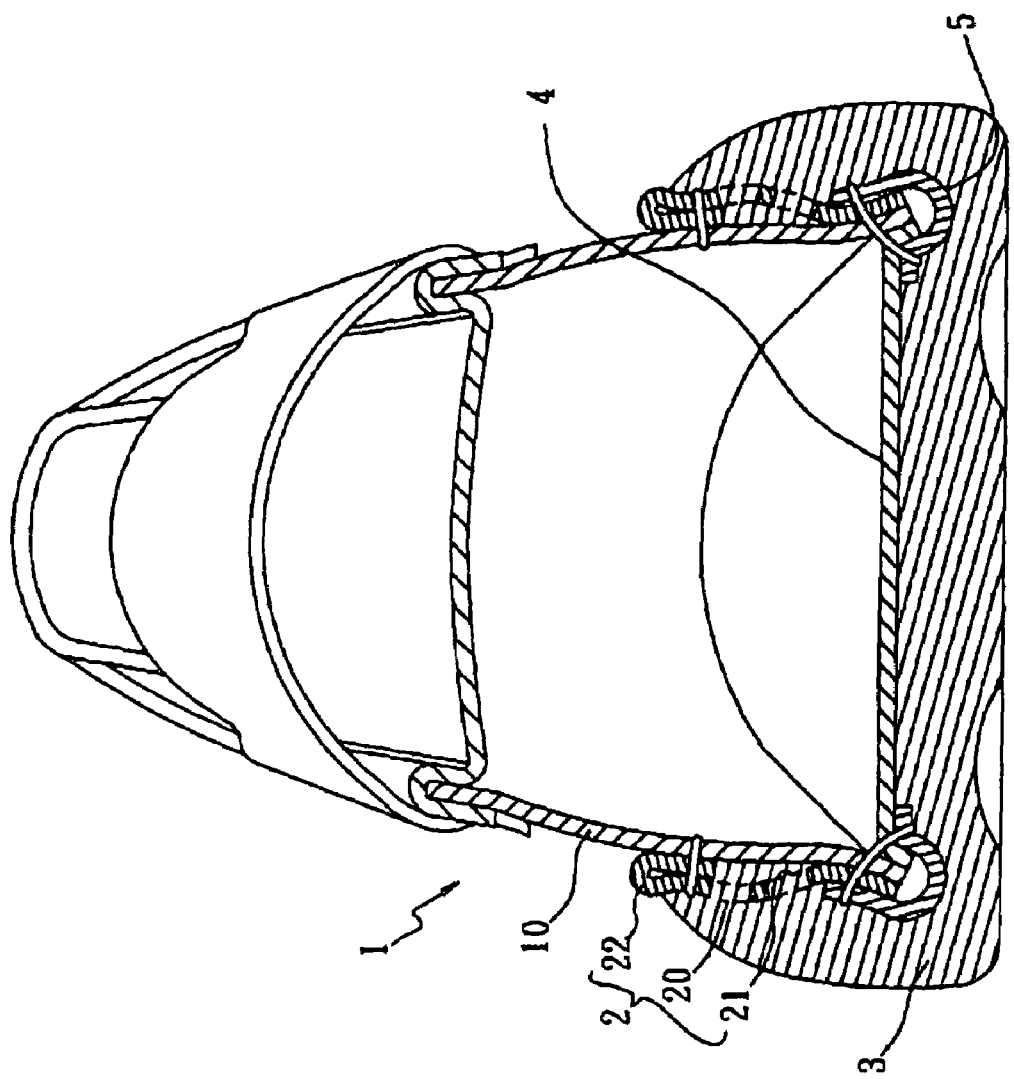
FIG. 5 is a rear end cross sectional view to show the outsole connected to the vamp.

Referring to FIGS. 1 to 5, the shoe 1 of the present invention comprises a vamp 10 which is composed of multiple parts stitched with each other and an insole 4 is connected to an underside of the vamp 10. A side panel 2 encloses a periphery of a lower portion of the vamp 10 and includes a plurality of apertures 20 defined therethrough. A gap 21 is defined between the vamp 10 and the side panel 2. The side panel 2 has a folding portion 22 at a top edge thereof and a connection member 5 combines a lower edge of the side panel 2, a lower edge of the vamp 10 and two sides of the insole 4.

An outsole 3 encloses the side panel 2 and the insole 4 and the material of the outsole 3, such as rubber, is filled in the at least one gap 21 and the apertures 20. A top edge of the outsole 3 is ended below the folding portion 22. The material of the outsole 3 can be melted and poured into cavity of mold set of the shoe which is put in the cavity such that the material of the outsole 3 can be convenient to fill each gap 21 and apertures 20 of the side panel 2.

It is noted that the shoe needs no stitching and gluing, and the outsole 3 is firmly connected to the vamp 10. The time spent for making the shoes can be shortened and the shoes are suitable to be made in mass production.

While we have shown and described the embodiment in accordance with the present invention, it should be clear to those skilled in the art that further embodiments may be made without departing from the scope of the present invention.

What is claimed is:

1. A shoe comprising:
   a vamp with an insole connected to an underside thereof;
   a side panel enclosing a periphery of a lower portion of the vamp and including a plurality of apertures defined therethrough, at least one gap defined between the vamp and the side panel, and
   an outsole enclosing the side panel and the insole, material of the outsole filled in the at least one gap and the apertures.

2. The shoe as claimed in claim 1, wherein the side panel has a folding portion at a top edge thereof and a top edge of the outsole is ended below the folding portion.

3. The shoe as claimed in claim 1, wherein a connection member combines a lower edge of the side panel, a lower edge of the vamp and two sides of the insole.

4. The shoe as claimed in claim 1, wherein the vamp is composed of multiple parts which are stitched with each other.

* * * * *